United States Patent [19]

Lindskog

[11] Patent Number: 4,544,518
[45] Date of Patent: Oct. 1, 1985

[54] METHOD AND APPARATUS FOR THE MANUFACTURE OF SHAPED ARTICLES FROM FIBRE-REINFORCED PLASTICS MATERIAL

[76] Inventor: Kjell J. Lindskog, Floravägen 27, S-931 00 Skellefteå, Sweden

[21] Appl. No.: 574,100
[22] PCT Filed: Apr. 29, 1983
[86] PCT No.: PCT/SE83/00172
  § 371 Date: Dec. 21, 1983
  § 102(e) Date: Dec. 21, 1983
[87] PCT Pub. No.: WO83/03794
  PCT Pub. Date: Nov. 10, 1983

[30] Foreign Application Priority Data

Apr. 30, 1982 [SE] Sweden ................ 8202744

[51] Int. Cl.⁴ ........................... B29H 9/02
[52] U.S. Cl. .................. 264/257; 264/316; 264/338
[58] Field of Search ........ 249/115; 264/128, 257, 264/313, 316, 320, 338, 510; 425/89, 810

[56] References Cited

U.S. PATENT DOCUMENTS 3,041,660  7/1962  Fink .................... 264/316
3,492,392  1/1970  Kasamatsu et al. ........ 264/258
3,705,248 12/1972  Hill et al. ............. 264/316
3,975,479  8/1976  McClean ................ 264/128

Primary Examiner—Donald Czaja
Assistant Examiner—V. Fischbach
Attorney, Agent, or Firm—Sughrue, Mion, Zinn, Macpeak, and Seas

[57] ABSTRACT

Manufacture of shaped bodies from fiber-reinforced plastics material, in which fibrous reinforcing material is positioned in a recess in a mould die (9, 10, 11) consisting of one or more parts. The die recess is then closed by means of a cover (12) which can move relative to the die, in order to form a mould cavity. A solidifiable, liquid plastics composition is introduced into the mould cavity and there subjected to a pressure of such magnitude as to substantially completely fill the cavity, the cavity then being held closed until the plastics composition has at least partially solidified. In order to reinforcing material to be used and in order to raise the mould capacity, the reinforcing material (4) is placed in the die recess while lying in prepared orientation in a thin-walled lining (1, 2) intended to be received in the die recess, the lining being removed, subsequent to a moulding operation, and replaced with a similar lining having fresh reinforcing material thereon. The aforedescribed lining is suitably formed by a recess (2) in a simple, readily handled plate (1). The invention also relates to apparatus for use when carrying out the method.

6 Claims, 7 Drawing Figures

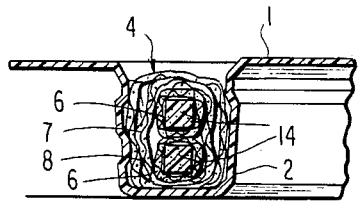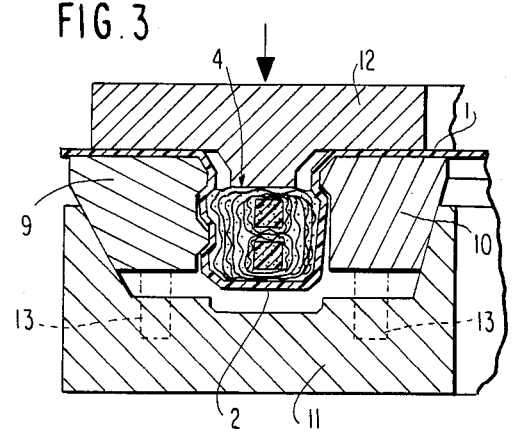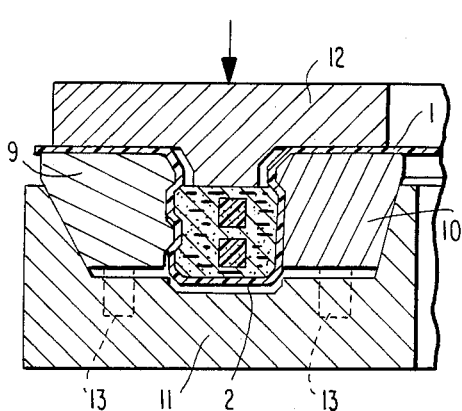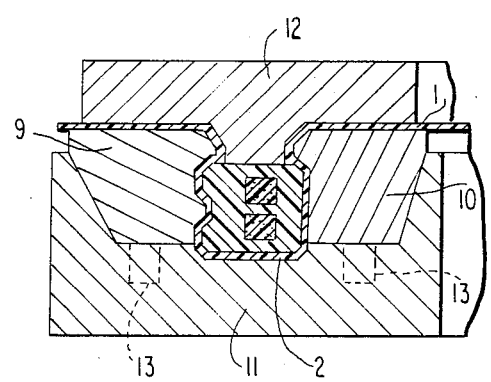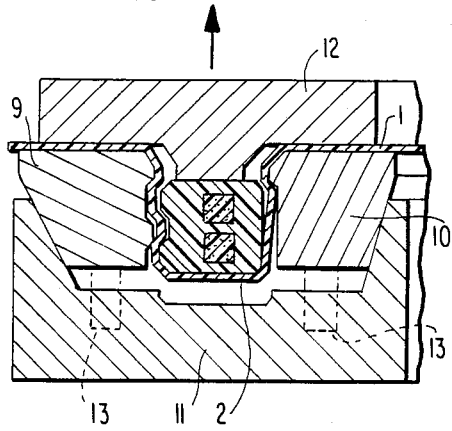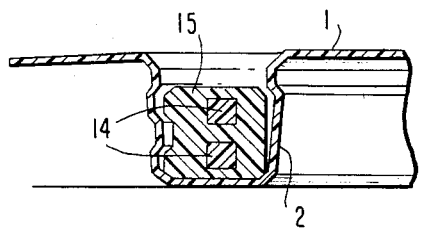

METHOD AND APPARATUS FOR THE MANUFACTURE OF SHAPED ARTICLES FROM FIBRE-REINFORCED PLASTICS MATERIAL

TECHNICAL FIELD

The present invention relates to a method in the manufacture of shaped articles from a fibre-reinforced plastics material, in which fibrous reinforcing material is placed in a channel or recess in a mould die consisting of one or more parts, said channel or recess being closed by a mould cover which is moveable relative to the die, such as to form a mould cavity, whereafter a solidifiable, liquid plastics composition is introduced into the mould cavity and subjected therein to pressure of such magnitude that the mould cavity becomes substantially completely filled with said plastics composition, said cavity then being held closed until the plastics composition has at least partially solidified.

BACKGROUND ART

Present day methodology of manufacturing shaped articles, by pressing in a mould a plastics composition which includes a fibrous reinforcing material is beset with a number of not-readily solved problems. These problems are particularly apparent when the article being produced is so shaped that the mould tool must be provided with undercut portions, and when the reinforcement is critical, i.e. when both the distribution and orientation of the fibres is a deciding factor in the desired quality of the final article. To enable the moulded article to be removed from a die having undercut portions, the die must comprise a plurality of parts which are capable of moving relatively to one another. In order to obtain a reinforcement in which the fibres are correctly aligned, it is necessary to manually place the reinforcing material directly into the channel or recess of the die.

When using present day moulds, shaped articles are normally produced in accordance with the aforegoing, with the aid of a pre-impregnated reinforcement (wet reinforcement), by which is meant a reinforcement which has previously been drenched with plastics composition in an amount sufficient to meet demands in respect of the shaped article intended, this reinforcement being placed in a recessed or channelled die and there compressed by means of an upper mould tool, whereupon excess plastics material is pressed out of the mould. The tightness of the mould is not critical in this respect, thereby enabling the use of so-called compression moulds, i.e. moulds in which the die comprises a plurality of parts capable of moving relative to one another, these parts being moved into their final, operative positions under the influence of the overlying mould tool. When an excessive amount of plastics material is used, the fact that some of this excess will be squeezed out through the junctions or flash surfaces between the various mould-tool parts has no decisive effect.

The use of a wet reinforcement in the aforedescribed manner is, inter alia, encumbered with two serious disadvantages, however. Firstly, the working environment is extremely poor, since the wet reinforcement must be handled manually, thereby exposing the workman to harmful gases eminating from the plastics composition. It would be very difficult and expensive to construct a work place for carrying out this method, in which all the requirements for a safe, non-toxic environment were satisfied. Secondly, the output rate of such moulds is very low, since the press must be shut down for relatively long periods of time, in order to enable the reinforcement to be placed in the die. Furthermore, difficulties can be experienced in positioning the reinforcing material correctly in the die, in precisely the manner intended, since this must be done directly in the mould tool. This is particularly true when manufacturing products whose shape is such as to render it impossible to pre-shape the reinforcements into simple, readily handled units.

Against this background, it would be desirable to work with a dry reinforcement, i.e. to position the reinforcement in the die in a dry condition, and not to introduce the plastics composition into the mould cavity until the mould has been closed by the upper mould tool. Among other things, this would mean that the plastics composition could be constantly held in closed spaces. The use of dry reinforcement, however, requires the mould cavity to be sealed, practically hermetically, since otherwise it is not possible to obtain the required pressure in the plastics composition charged to the mould cavity. It is particularly difficult to achieve the requisite tightness in a die which includes a plurality of parts capable of moving relative to one another, since dry reinforcing material is relatively spiky, i.e. fibres constantly protrude outwardly from the surfaces thereof, these fibres becoming firmly trapped between the tool parts or flash surfaces, thereby to impair the seal therebetween. This is difficult to avoid, since when uncompressed, the reinforcement material can have a volume which is at least equal to, and often greater than the volumetric capacity of the mould cavity, particularly when the reinforcement includes filler bodies, meaning that the reinforcement must be pressed down into the channel or recess in the die. As a result hereof, the reinforcement will lie relatively hard against the defining surfaces of the channel or recess, and can readily be pressed into any joints present between the mould-tool parts.

OBJECT OF THE INVENTION

A primary object of the invention is to provide a method in the manufacture of shaped articles according to the methodology described in the introduction, in which dry reinforcing material can be used while overcoming the aforementioned disadvantages, even in the manufacture of articles of complicated shape and/or where high demands are placed on the manner of reinforcement; and which enables the output rate of a mould tool to be substantially increased.

BRIEF SUMMARY OF THE INVENTION

These objects are achieved in accordance with the invention by positioning the reinforcing material, in its intended orientation, in a thin-walled lining arranged to cooperate with the channel or recess of the die; placing said lining with the reinforcing material orientated thereon into said die channel or recess; removing said lining upon completion of a moulding operation; and by replacing the removed lining with a similar lining having fresh reinforcing material orientated thereon.

Thus, the invention affords the advantage whereby the dry reinforcing material can be arranged in simple, replaceable linings in a working operation which is completely separate from the working cycle of the mould tool; and whereby such a lining having a prepared reinforcement arranged thereon can be readily and quickly placed into the mould tool prior to each moulding operation. When using a lining in accordance with the aforegoing, dry reinforcing material can also be used for articles of complicated shape, which require the mould dies to be constructed from parts capable of moving relative to one another, since the reinforcing material is enclosed in the lining and is unable to penetrate between the parts of the mould so as to impair the seal therebetween. Since the reinforcing material can be positioned in the linings in environmentally favourable working sites, at locations remote from the mould, it is simple to position and orient the reinforcing material in the manner desired.

In addition to the time saved as a result of this simple positioning of the reinforcing material in the mould, the time taken for the mould to carry out a working cycle can be further reduced by, inter alia, the fact that the shaped article can be removed from the mould while resting on the lining, which means that the plastics composition need not have solidified to the same extent as that required when the shaped article is ifted separately from the mould cavity. Moreover, both heating medium and cooling medium can be readily caused to circulate around the lining at the commencement of and, respectively, the termination of a moulding cycle, to accelerate hardening and cooling respectively.

In accordance with one embodiment of the invention, the mould cavity is first closed to a volume corresponding to the desired shaped article, whereafter plastics composition is introduced into the mould cavity under pressure. Alternatively, the plastics composition can, to advantage, be supplied to the lining placed in the mould cavity, before the chamber has been fully closed, whereupon an increase in pressure in the plastics composition is obtained by reduction of the volume of the mould cavity to a volume corresponding to the desired shaped article. The lining is suitably made of a slightly flexible material, enabling the shape of the lining to adapt to the shape of the mould cavity when the plastics composition is placed under pressure. Suitably, said lining is formed by a channel or recess in a relatively rigid, readily handled plate.

Although the lining suitably has a shape which conforms well with the shape of the die channel or recess, it should be observed that the shape of the article being moulded is not determined by the liner, but by the shape of the die lying outside said liner. Consequently, the liner cannot be compared with flexible moulds or dies used in previous moulding methods to facilitate removal of the finished product. Flexible moulds of this kind cannot be used when shaping articles under pressure in accordance with the present invention. The flexibility of the liner according to the invention will, of course, enable the shaped article to be readily removed therefrom when the liner is no longer under pressure from the mould die.

The invention will now be described in more detail with reference to an embodiment thereof illustrated in the accompanying drawings.

BRIEF DESCRIPTION OF THE DRAWINGS

FIG. 2 is a sectional view taken on the line A—A through the plate illustrated in FIG. 1, with reinforcing material positioned in said plate.

FIGS. 3-6 are sectional views taken on the line A—A through the plate and a moulding press in which the plate illustrated in FIG. 2 is positioned.

FIG. 7 is a sectional view taken on the line A—A through the plate shown in FIG. 1, subsequent to a completed moulding operation.

DESCRIPTION OF A PREFERRED EMBODIMENT OF THE INVENTION

Figure 1:
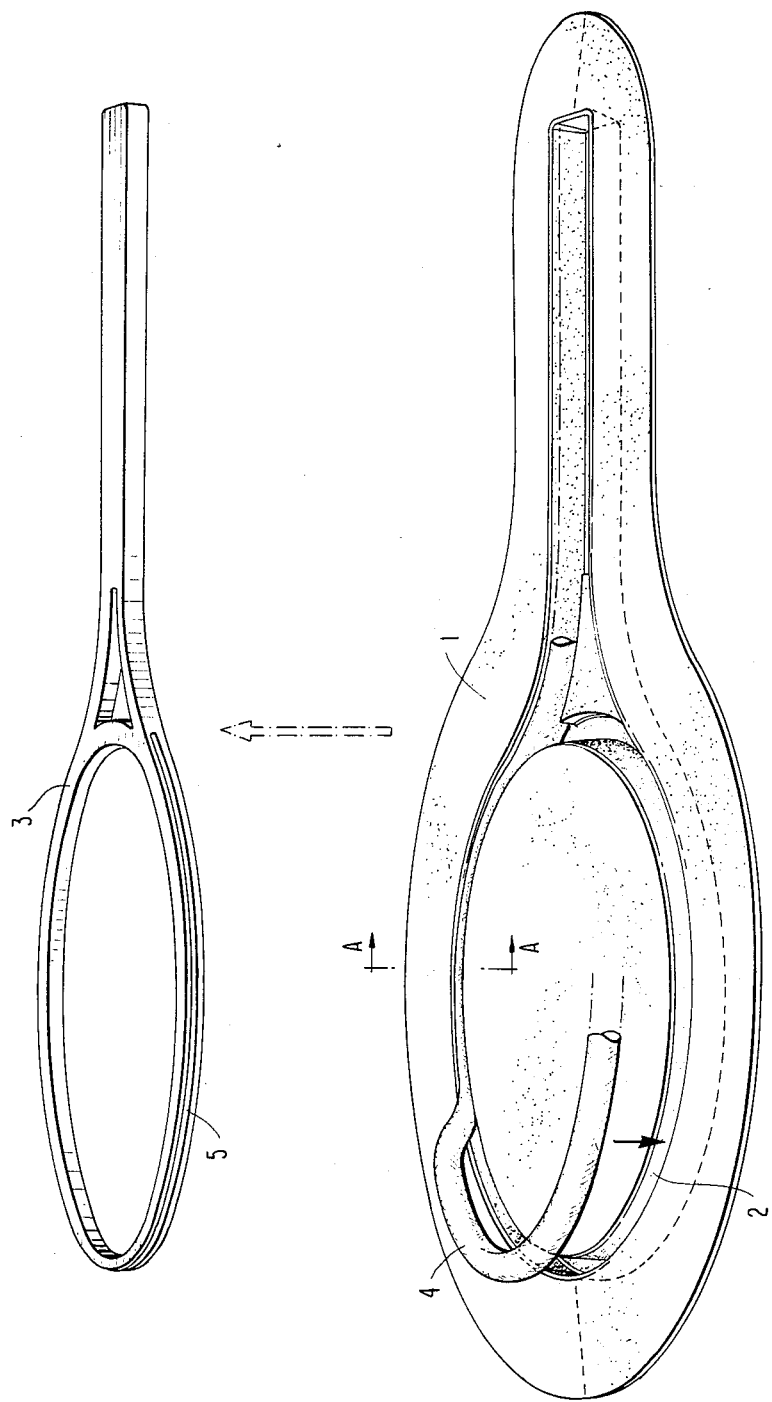
FIG. 1 illustrates a liner, in the form of a plate, intended for use when manufacturing a tennis racquet having the illustrated configuration.

FIG. 1 illustrates a plate 1 which is made of a relatively rigid, but nevertheless flexible plastics material, such as polyethylene, and which is provided with a channel or recess 2 intended to be received in the channel or recess of a die of a mould tool. In the illustrated embodiment, the plate and associated mould tool are intended for manufacturing a tennis racquet 3, having the shape illustrated in the Figure. When the plate 1 is placed on the die of a moulding tool, the channel or recess 2 will be received in the corresponding channel or recess of the mould die, to form a lining therefor. The shape of the liner channel or recess is made to conform, as closely as possible, to the shape of the channel or recess in the die. The flexibility of the material from which the plate 1 is made shall be such, however, that the liner 2 can be caused to conform accurately to the shape of the die channel or recess when placed under pressure. Thus, the plate 1, or the channel 2, does not determine the shape of the racquet 3, the shape of said racquet being exclusively determined by the outer mould tool.

As mentioned above, a plate according to FIG. 1 enables dry reinforcing material to be positioned (downwardly pressed) in the channel or recess 2, in a separate working operation in a favourable working environment. In the case of tennis racquets for example, the reinforcement and also, when used, the filler bodies are of decisive significance to the qualities of the racquet. The fibres of the reinforcing material must be correctly aligned, and in the FIG. 1 embodiment the reinforcement, together with enclosed filler bodies, has been pre-fabricated into a supple hose-like body 4, the outer layer of which comprises a glass-fibre stocking. The reinforcement 4 has a volume sufficient to well fill the channel or recess 2; as a result of the filler bodies enclosed therein, the reinforcement will be relatively springy, i.e. a certain amount of force is required to bend it to the desired shape. Consequently, the reinforcement 4 must be lightly pressed into the channel or recess 2. If the reinforcing material were to be pressed, in a corresponding manner, directly into a tool comprising moveable parts, problems would arise with respect to the desired tightness of the mould. In order to increase the rigidity of the racquet over a given portion thereof, further reinforcing strips can be readily pressed down between the reinforcing body 4 and the walls of the channel or recess 2. In order to manufacture racquets of mutually different weight, filler bodies of varying volume can be embedded in the reinforcing body 4.

The tennis racquet illustrated in FIG. 1 has a circumferential groove 5 arranged therearound, for protection of the strings. To enable a tennis racquet of the illustrated shape to be removed from a mould die, the die must be divided into units capable of moving relative to one another.

FIG. 2 is a sectional view taken on the line A—A in FIG. 1, through the plate 1 with an inserted reinforcing body 4. The reinforcing body comprises two longitudinally extending filler bodies 14 of suitable material and of low weight, each of which is surrounded by an individual reinforcing layer 6. Both filler bodies 14 are then enclosed together in two further layers 7 and 8 of reinforcing material, of which the outer layer comprises the aforementioned glass-fibre stocking.

A reinforcing and filler body according to the above can be manufactured in the form of piece goods of indefinite length in a separate working operation, and clipped to the desired length prior to a moulding operation, and pressed down into the channel 2 in an insert plate 1, which can then be readily placed into the mould tool as a unit.

FIG. 3 is a schematic, sectional view according to FIG. 2 through the plate 1 with an inserted reinforcing body 4, and through a corresponding part of a mould tool in which the plate is placed. In order to provide the tennis racquet with the circumferential groove 5 illustrated in FIG. 1, the mould is of the so-called compression type, and comprises a lower die having a recess defined by a plurality of parts 9, 10 and 11 capable of moving relatively to one another, and an upper mould tool 12. The plate 1 with the reinforcing body 4 arranged in the channel or recess 2 of said plate is then placed in the lower die, so that the channel or recess 2 forms a lining for a corresponding channel or recess in the die. This is carried out with the die parts 9 and 10 held in a raised position, with the aid of springs 13.

The die parts 9, 10 and 11 are provided with coacting wedge surfaces, which cause said parts 9 and 10 to be displaced towards one another when they are pressed down by the upper mould tool 12, which serves as a cover for the moulder chamber or cavity, against the action of springs 13. In the position illustrated in FIG. 3, the upper mould tool 12 has just come into contact with the die parts 9 and 10. Upon further downward movement of the mould tool 12, the liner 2 is compressed around the reinforcing body 4, as a result of movement of the die parts 9 and 10 towards each other.

FIG. 4 illustrates the position where the upper mould tool 12 has been pressed down still further, so as to force the parts 9 and 10 of the die downwardly and towards each other to a position in which, due to the action of springs 13, sealing abutment is obtained between the plate 1 and the die parts 9, 10 and 12 respectively. Thus, in this position the mould cavity defined by the liner 2 and the upper mould tool 12 is completely closed, and hence plastics composition can be introduced into said cavity through a connection (not shown). The plastics composition must be introduced under a pressure sufficient to ensure that the cavity is filled satisfactorily. When this has been achieved, the mould tool 12 is forced down still further, as illustrated in FIG. 5, whereupon the pressure in the mould cavity is raised substantially, causing the plastics composition to exert a force of such magnitude on the liner 2 that said liner takes a shape which coincides totally with the shape defined by the surrounding mould parts.

The upper mould tool 12 is held in the downwardly pressed position illustrated in FIG. 5, while the plastics composition solidifies, at least partially, to the shape determined by the mould parts. The upper mould tool 12 is then lifted from the die, whereupon the springs 13 raise the die parts 9 and 10, causing said parts to move slightly away from one another, as illustrated in FIG. 6. When the tool 12 has been raised still further, the plate 1 together with the shaped body 15 resting on the channel or recess 2 of said plate can be readily removed from the die and placed in a suitable storage location, to permit the plastics composition to harden completely, see FIG. 7. The shaped article can then be readily removed from the plate, owing to the flexibility thereof. The plate can thus be made in the form of a single unit, even when shaping articles having undercut portions.

As an alternative to the aforedescribed sequence of operations, the plastics composition is not introduced into the mould cavity until the mould is fully closed, to the position illustrated in FIG. 5, said plastics composition being introduced under such pressure as to ensure that the liner 2 is filled and outwardly pressed to the extent required. The method first described is preferred, however, and a pre-requisite for this method is the use of an insert plate according to the invention.

The time taken to complete a moulding process in accordance with the aforegoing can be further shortened when applying the invention, by causing a heating fluid, such as a flow of gas or liquid, to pass between the liner 2 and the die part 11, in the position illustrated in FIG. 3, thereby to warm the surfaces of the plastics composition, to facilitate the hardening process. Correspondingly, in the position illustrated in FIG. 6 a cooling fluid, such as a flow of gas or liquid, can be utilized to cool said surfaces, causing the product to obtain a rigidity sufficient to enable it to be removed from the mould press at an earlier stage than would otherwise be the case.

The wall thickness of the plate is suitably very small and constant, and is slight in relation to the smallest cross-dimension of the mould cavity.

Another important advantage afforded when using a plate according to the invention is that when manufacturing an article of the described kind, the division between the opposing faces of the mould tool 12 and the die parts 9 and 10, as illustrated in FIGS. 3–6, can lie slightly inwardly of the planar surface of the article, which greatly simplifies subsequent removal of the flash or fins which may form between the flash surfaces, or joints, of said mould components. Both of the joints can be cleaned off in one and the same working operation.

A plate according to the invention costs relatively little to manufacture, since it need not fulfil the same requirements as those placed on a mould component. In addition to plastics, the plate can also be manufactured from sheet metal or some other material. Depending upon the flexibility of the material from which the plate is made, the recess provided in the plate may be adapted more or less to the shape of the mould tool. Although not shown, the plate may be used together with a lid arranged to close the recess in said plate.

As will readily be understood, the technique according to the present invention can also be applied in the manufacture of shaped articles other than tennis racquets, and particularly in the manufacture of articles of complicated shape, where the positioning and orientation of the reinforcement is highly critical. Plates according to the invention can, of course, also be used in conjunction with moulds other than the illustrated mould, for example an uncomplicated, two-part mould. The plate also affords important advantages in this cae, since the reinforcing material can be positioned in a working operation totally separate from the press, thereby affording a significant saving in time and improving the possibilities of achieving the best possible result. The invention can also be applied in both heat-shaping and cold-shaping operations, irrespective of the manner in which the reinforcing body is constructed.

I claim:

1. In a method of manufacture of shaped articles from a fibre-reinforced plastics material, in which dry spiky fibrous material is placed in a recess in a mould die consisting of one or more parts, said recess being closed by means of a mould cover which is moveable relative to the mould die, thereby to form a mould cavity, whereafter a solidifiable, liquid plastics composition is introduced into the mould cavity and there subjected to pressure of such magnitude that the mould cavity becomes substantially completely filled with said plastics composition, said mould cavity then being held closed until the plastics composition has at least partially solidified, the improvement wherein said method includes, in sequence, the steps of:

positioning said dry spiky reinforcing material in its intended orientation in a thin-walled replaceable lining consisting of a channel-shaped plate of stiff flexible plastics material capable of taking the shape of the mould with the shape and size of the stiff, flexible channel-shaped plate corresponding to that of the mould cavity and filling said channel-shaped plate recess with said dry spiky reinforcing material such that said lining maintains the approximate shape of the finished article during filling of the reinforcing material within the channel recess with said lining functioning as a tray for said dry spiky reinforcing material during insertion into and removal from the mould die;

placing said lining with said reinforcing material oriented therein into said die recess;

removing said lining and the moulded article therein upon completion of the moulding operation; and replacing the removed lining and moulded article with a similar lining having fresh dry spiky reinforcing material oriented therein after filling the channel-shaped recess of the similar lining with fresh dry spiky reinforcing material.

2. A method according to claim 1, characterized by first closing the mould cavity to a volume corresponding to the desired shaped article; and by subsequently introducing plastics composition under pressure into said mould cavity.

3. A method according to claim 1, characterized by introducing the plastics composition into the lining placed in said mould cavity prior to fully closing said cavity; and by causing an increase in pressure in the plastics composition, by reduction of the volume of the mould cavity to a volume corresponding to the desired shaped article.

4. A method according to any one of claims 1–3, characterized by adapting the shape of the lining accurately to the shape of the mould cavity while introducing plastics composition thereinto under pressure.

5. A method according to claim 1, characterized by flushing a warm and/or cold fluid around at least part of the lining at the commencement and termination respectively of the moulding period, to accelerate hardening and cooling respectively of the plastics composition.

6. In an apparatus for use in manufacturing shaped articles from fibre-reinforced plastics material comprising a mould die (9, 10, 11) of one or more parts, said die being provided with a recess for receiving dry spiky fibrous reinforcing material, said recess being closed by means of a mould cover (12) which is moveable relative to said die, thereby to form a mould cavity, the improvement wherein said apparatus further includes a replaceable thin-walled stiff flexible lining (1, 2) consisting of a channel-shaped plate of stiff plastics material with said channel-shaped plate being configured and sized to the shape of said die recess and positioned therein and bearing dry spiky reinforcing material filling the recess of said channel-shaped plate, said stiff flexible lining maintaining the approximate shape of the finished article when reinforcing material is placed in the lining before the lining is introduced into the mould and the stiff flexible lining permitting the lining and the filled dry spiky reinforcing material to maintain its shape while being handled as a tray during insertion into and removal from the mould die.

* * * * *